United States Patent Office 3,503,511
Patented Mar. 31, 1970

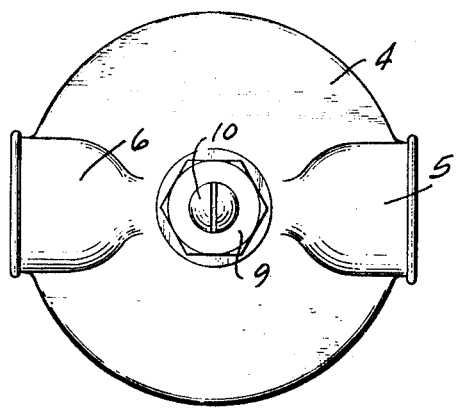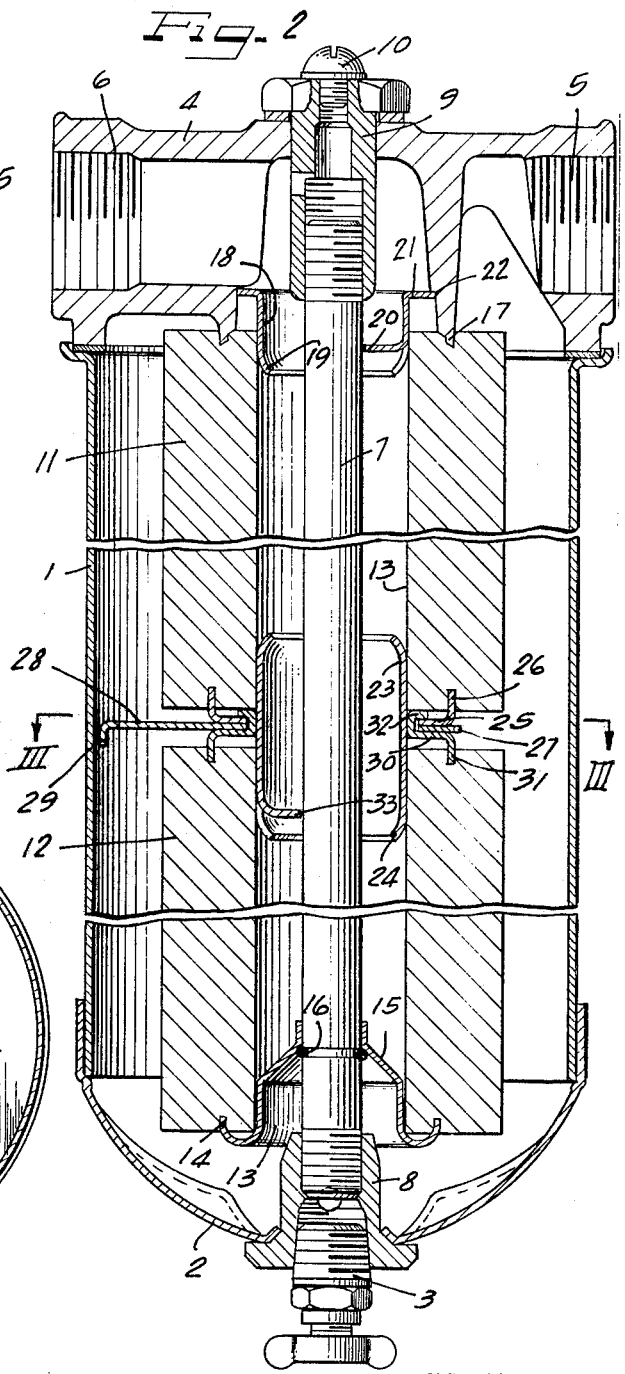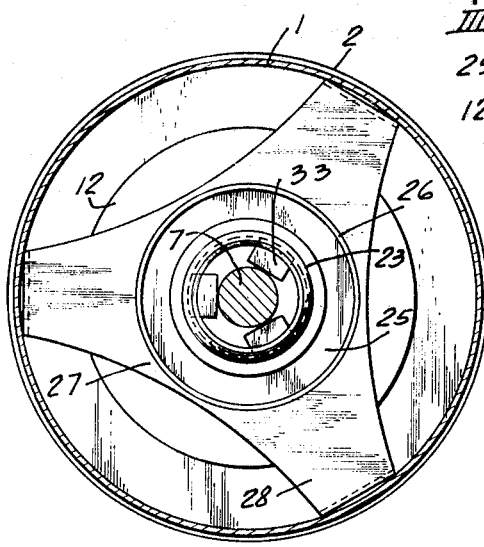

3,503,511
CENTERING MEANS FOR FILTER ELEMENTS
Albert E. Spitzberg, Indianapolis, Ind., assignor to The Carborundum Company, Niagara Falls, N.Y., a corporation of Delaware
Filed Sept. 7, 1967, Ser. No. 666,145
Int. Cl. B01d 25/02
U.S. Cl. 210—232                                    4 Claims

ABSTRACT OF THE DISCLOSURE

Centering means for maintaining a tubular filter element in a straight position around a center bolt within a casing, and for aligning superposed filter elements and maintaining them in proper straight position when such are utilized.

BACKGROUND OF THE INVENTION

Field of the invention

This invention or discovery pertains to the art of fluid filtration, and more particularly to the type of a filter embodying a bottomed casing having a center bolt extending longitudinally thereof with a tubular filter element or unit disposed in the casing around the center bolt, the invention embodying means to maintain the filter tube concentric with the center bolt, and means to maintain a plurality of superposed filter elements in alignment with each other, concentric around the center bolt, and concentric relatively to the filter casing.

Description of the prior art

Various efforts have been made heretofore in order to center a filter element around a center bolt or center tube disposed within the casing of a filter assembly, usually in the form of guide means. Some of these previous centering means do not accomplish the purpose of maintaining the filter element in a straight position and concentric with the center bolt or tube so that a positive seal could be effected at the ends of the filter element and the casing assembly, in many cases. Some centering guides were provided that extended substantially the full length of the center bolt or tube and were objectionably costly to manufacture and assemble. Usually the center opening through the tubular elements was larger than either a center bolt or tube with or without guide means and thus an objectionable amount of eccentricity occurred between the tubular element and the center bolt or tube rendering it difficult to obtain a good seal at the ends of the filter element. In many instances two or more tubular filter elements are stacked or arranged in a line extending longitudinally of the casing. Means have heretofore been provided to effect a seal between adjacent element ends so that fluid cannot be bypassed between the ends of the stacked elements. However, due to variances in diameter of the opening through the elements and the fact that the elements were larger than guide means heretofore used, eccentricity was frequently present not only between the elements and the center bolt or tube but also the elements were not maintained in alignment with each other. This again rendered sealing of the upper end of the top element and the lower end of the bottom element with the casing assembly extremely difficult. Further, in many instances a connection is made with a center bolt or tube to force the sealing means into engagement with the adjacent end of a filter element and eccentricity of the filter element provided another problem, namely searching or fishing for the end of the center bolt, and this was especially true when the means engaging the end of the center bolt passed through the cover of the filter casing.

SUMMARY OF THE INVENTION

The instant invention embodies a tubular member sized to snugly fit within the end portion of the passage through a tubular filter element, and the member is provided with inward projections to contact the center bolt of a filter assembly and thus maintain the element concentric with the center bolt so that an end seal on the element is easily effected and there is no searching or fishing necessary to locate the center bolt with an attaching nut or the like through the cover on the filter casing. The invention also contemplates provision of a similar member sized to snugly fit within the adjacent end portions of stacked tubular filter elements, and this member has both inward projections and outward projections, the latter for contact with the inside of the casing wall whereby both elements are maintained in alignment with each other and concentric with respect to both the center bolt and the casing and there is no relative eccentricity between the stacked elements. With this simple construction, all of the problems involved in the prior art as above mentioned are effectively solved. Further, the instant invention is extremely economical to manufacture, and is not installed as a permanent part of the filter assembly, but is removable, and replaceable with the filter elements, and may be repeatedly used when elements are disposed of and new ones substituted.

BRIEF DESCRIPTION OF THE DRAWING

FIGURE 1 is a top plan view of one form of filter casing in which the instant invention may be utilized;
FIGURE 2 is an enlarged central vertical sectional view through the structure of FIGURE 1, with centering means embodying principles of the instant invention shown in operative position; and
FIGURE 3 is a transverse plan sectional view taken substantially as indicated by the line III—III of FIGURE 2.

DESCRIPTION OF THE PREFERRED EMBODIMENT

Filted casing assemblies are of various sizes and types. In some instances both the inlet and outlet may be provided in the cover for the filter casing and a cover nut engaged with a center bolt as illustrated and described herein by way of example. In other instances, the inlet may be through the casing wall or cover, while the outlet may be through a center tube and the bottom of the casing, but even so some means will be attached to that upper end of the center tube to establish a sealing off of the upper end of a filter element. Accordingly, where the term "center bolt" is used herein, the same is to be considered synonymous with a center tube.

The illustrated embodiment of the instant invention is shown associated with a filter assembly including a casing 1 having a bottom 2 equipped with the usual drain plug 3. The casing is provided with a cover 4, having a threaded inlet 5 on one side and a threaded outlet 6 upon the other side. A center bolt 7 extends longitudinally through the casing, the bolt being threaded at each end, one end being engaged in a base plug 8 and the other end being engaged by a cover nut 9 equipped with a vent screw 10, the cover nut when tightened holding the cover securely and fluid tightly on the casing. Suitable gaskets are, of course, utilized wherever needed.

In the illustrated instance, the casing 1 contains a plurality of tubular filter elements of which two 11 and 12 are seen in the drawings. These filter elements are arranged in stacked or end-to-end relationship, and it will be seen that the passage 13 through each element is of much greater diameter than the center bolt 7. It is important that the filter elements be maintained in as nearly exact alignment as possible and that the elements be concentric relatively to the center bolt and relatively to the inside wall of the casing 1, in order to insure easy and adequate sealing off of the ends of the filter elements. With a plurality of filter elements, the inner end of the inner element must be sealed off, the adjacent ends between the elements must be sealed off, and the outer end of the outer element must be sealed off so that fluid to be filtered does not pass freely around the ends of any filter element rather than through the element. Where only a single element is used in the casing, the inner and outer ends of that element must also be sealed off in the same manner.

The filter elements 11 and 12 may be made of any suitable material, elements comprised of helically wound and napped roving being one example of highly satisfactory elements. Such elements may be made as set forth more fully in Goldman Patent No. 1,958,268 dated May 8, 1934 and the Hastings Reissue Patent No. 22,651 dated June 12, 1945.

In order to effect sealing of the end of the filter element adjacent the bottom of the casing, the center bolt 7 has attached thereto a tubular filter seat 13 of a size to snugly enter the passage through the filter element. The inner portion of the seat 13 is curved in a loosely retroverted manner to provide an outwardly extending annular flange 14 upon which the filter element seats and which bites into the element as seen in FIGURE 2 when pressure is applied in a direction longitudinally to the element, thus establishing a positive seal of the element end. The outer portion of the seat 13 is shaped inwardly as indicated at 15 into intimate contact with the center bolt and maintained in position on the center bolt with the aid of a snap ring 16 or in an equivalent manner.

At the outer end of the casing sealing is effected with the adjacent end of a filter element by means of an annular sharp pointed flange 17 depending from the cover in concentric relationship with the center bolt 7 and this flange is caused to bite into the adjacent end of the filter element as seen in the upper portion of FIGURE 2 when the cover is tightened into place upon the casing.

Adjacent the sealing flange 17, a tubular centering member is provided which is of a diameter to snugly telescope within the outer end of the adjacent filter element. The inner end of this member 18 is swaged inwardly as at 19 to afford easy entry into a filter element. A plurality, in the illustrated instance three, evenly spaced tongues 20 are struck from that portion of the member 18 that enters the filter element and bent inwardly for edgewise contact with the center bolt 7 to maintain the filter element concentric with the center bolt. The member 18 is maintained in position by means of an outwardly extending annular flange 21 on the outer end of the member which is engaged by a shoulder 22 in the cover and positively held in place when the cover is tightened in position on the casing. If the filter element were not concentric with the center bolt, the outer end thereof would be tipped somewhat relatively to the sealing flange 17 carried by the cover and the seal effected by the flange 17 would not be evenly engaged with the filter element entirely therearound and might be completely ineffective in some location. Such failure of proper centering might also render the seal by the flange 14 adjacent the bottom of the casing also partially ineffective or insecure. However, the tongues 20 maintain the outer end of a filter element evenly concentric with respect to the center bolt, and the seal is complete and positive both at the outer and inner ends of the casing. The centering element 18 may easily be inserted in the end of the filter element or removed therefrom by hand, since it is not securely attached to anything and may be repeatedly used.

Where two or more elements in stacked relationship are utilized within the casing, as illustrated, a centering and sealing member is disposed between adjacent ends of the elements. In this instance the centering member comprises a tubular body 23 of sufficient length to extend partially within the end portions of both filter elements 11 and 12, both ends of the tubular member 23 being swaged inwardly for easy entry into the elements, and the diameter of the member 23 is such as to snugly fit within the elements. Fabricated annular flange means are secured around the tubular body 23 by welding, soldering, brazing or any equivalent manner. These means include a washer-like element 25 having the outer portion thereof shaped to form an annular flange 26 extending longitudinally of the member 23 for biting engagement in the filter element 11. A spider 27 having a plurality of outwardly projecting fingers 28, three being shown in the illustrated embodiment, is disposed immediately beneath the flanged member 25. Each of the fingers preferably has a downwardly turned end portion as indicated at 29. These fingers are sized to contact the inside surface of the casing 1 as seen clearly in FIGURE 3. Beneath the spider 27 is another washer-like member 30 having the outer portion thereof shaped to form a flange 31 extending longitudinally of the member 23 but in the opposite direction to the flange 26, for biting engagement in the upper end of the element 12. The inner portion of this washer 30 is folded around the inner margins of the members 25 and 27 to lock all three members together, as shown at 32, and it is the portion 32 that is secured to the outer surface of the member 23. Inwardly extending tongues 33 are struck from the side of the element 23 and turned inwardly for edgewise contact with the center bolt 7, in the same manner as the tongues 20 above described. The entire tubular sealing element is easily removable and replaceable by hand and may be repeatedly used.

The centering means herein described maintains the filter elements 11 and 12 in exact alignment with each other and with both elements concentric both as to the center bolt 7 and as to the casing 1 whereby a good positive seal is effected at each end of each element.

With the cover nut 9 and cover 4 removed from the casing, it is a simple expedient to accurately position the filter elements or element as the case may be. Assuming that there are a plurality of filters in stacked relationship, it is a simple expedient while outside the casing to insert a tubular member 23 between adjacent ends of the elements. Finally the member 18 may be inserted in the upper end of the upper element. Then, the entire assembly may be slipped into the casing over the center bolt 7 and the centering means will cause the elements to be properly positioned within the casing, concentric with the center bolt and concentric with the casing wall, and the lowermost element to properly seat on the upturned flange 14 of the member 13. When the cover is placed on top of the casing, it is a simple expedient to tighten down the cover nut 9 onto the center bolt, and there is no need to fish or grope for the exact location of the center bolt since it will be maintained in precise position because of the centering means. When the cover nut is tightened down the various flanges at the bottom of the lower element, those between the elements, and the flange 17 depending from the cover will be caused to bite in the ends of the respective elements and proper sealing is thus promptly and adequately obtained. With a single element alone utilized, it is a simple expedient to place the tubular member 18 in the outer end of the element, and with its aid properly seat the element on the sealing flange 14. When the cover is again tightened on the casing there will be an effective seal in the proper location at each end of the element.

When it is necessary to replace the elements or element with new filter elements, it is a simple expedient to remove the cover nut 9, take the cover off the casing, withdraw the elements themselves or unscrew the center bolt from the base plug 8 and withdraw the center tube lifting out all the elements at one time.

It will be understood that modifications and variations may be effected without departing from the scope of the novel concepts of the present invention.

I claim:
1. A filter assembly having inlet and outlet openings and including a casing, a cover for said casing, a center bolt in said casing, a tubular filter element around said center bolt, and means in said assembly for sealing the ends of said filter element to prevent bypassing of contaminated fluid, wherein the improvement comprises
   a tubular centering member of a diameter to snugly telescope into said filter element, and
   a plurality of spaced tongues struck from the wall of said tubular member to contact the center bolt and maintain said filter element concentric therewith to insure the effectiveness of said sealing means.
2. The filter assembly of claim 1, including
   a second and like filter element in stacked relationship with the first said filter element,
   a second tubular centering member of a diameter and length to extend partially within the adjacent ends of both said filter elements,
   means extending inwardly from said second centering member to contact said center tube and maintain said filter elements in alignment, and
   sealing means carried by said second centering member for contacting and sealing off the adjacent ends of said filter elements.
3. The filter asembly of claim 2, wherein the sealing means carried by the second centering member comprise oppositely extending flanges for biting engagement into the adjacent ends of said filter elements.
4. The filter assembly of claim 2, including
   means extending outwardly from said second centering member to contact said casing and maintain said filter elements concentric with said casing.

References Cited

UNITED STATES PATENTS

| | | | |
|---|---|---|---|
| 2,606,628 | 8/1952 | Hasselwander | 210—440 X |
| 2,870,914 | 1/1959 | Bloch | 210—453 |
| 3,246,920 | 4/1966 | Pall | 210—232 X |

REUBEN FRIEDMAN, Primary Examiner

T. A. GRANGER, Assistant Examiner

U.S. Cl. X.R.

210—444